(12) United States Patent
Verrall et al.

(10) Patent No.: US 9,796,833 B2
(45) Date of Patent: Oct. 24, 2017

(54) CARBOXYMETHYL CELLULOSE-BASED FILMS AND EDIBLE FOOD CASINGS MADE THEREFROM

(75) Inventors: Andrew P. Verrall, Crown Point, IN (US); Solomon E. Brown, Naperville, IL (US)

(73) Assignee: MONOSOL, LLC, Merrillville, IN (US)

( * ) Notice: Subject to any disclaimer, the term of this patent is extended or adjusted under 35 U.S.C. 154(b) by 1660 days.

(21) Appl. No.: 12/184,458

(22) Filed: Aug. 1, 2008

(65) Prior Publication Data

US 2009/0035426 A1   Feb. 5, 2009

Related U.S. Application Data

(60) Provisional application No. 60/953,650, filed on Aug. 2, 2007.

(51) Int. Cl.
| | | |
|---|---|---|
| *A23L 1/48* | (2006.01) | |
| *A23L 1/22* | (2006.01) | |
| *C08L 1/28* | (2006.01) | |
| *A22C 13/00* | (2006.01) | |

(52) U.S. Cl.
CPC .......... *C08L 1/286* (2013.01); *A22C 13/0013* (2013.01)

(58) Field of Classification Search
CPC ... A23L 1/22; A23L 1/48; C08L 1/286; C08L 1/00; A22C 13/0013
USPC ........ 426/92, 601, 650, 658, 661, 638, 289, 426/291, 630, 286, 531, 615, 91
See application file for complete search history.

(56) References Cited

U.S. PATENT DOCUMENTS

| | | | |
|---|---|---|---|
| 2004/0136923 A1 | 7/2004 | Davidson | |
| 2005/0129814 A1* | 6/2005 | Weibel | 426/138 |
| 2005/0208110 A1* | 9/2005 | Singh et al. | 424/443 |
| 2006/0073190 A1* | 4/2006 | Carroll et al. | 424/440 |

FOREIGN PATENT DOCUMENTS

| | | |
|---|---|---|
| EP | 1 634 501 | 3/2006 |
| WO | WO-98/20752 A1 | 5/1998 |
| WO | WO 02/102173 A2 | 12/2002 |

OTHER PUBLICATIONS

Cellogen Sodium Carboxymethyl Cellulose, Dai-Ichi Kogyo Seiyaku Co. Ltd.*
ISR for counterpart International Application No. PCT/US2008/071868, dated Oct. 30, 2008.
Written Opinion of the ISA for counterpart International Application No. PCT/US2008/071868, dated Oct. 30, 2008.

* cited by examiner

*Primary Examiner* — Hamid R Badr
(74) *Attorney, Agent, or Firm* — Marshall, Gerstein & Borun LLP

(57) ABSTRACT

An edible film useful for applying a flavoring additive to a food item is disclosed. The edible film generally includes an edible carboxymethyl cellulose film-forming resin and an edible plasticizer. The carboxymethyl cellulose film-forming resin is preferably a blend of two different carboxymethyl celluloses having different molecular weights. The edible film preferably includes additional additives, for example an edible surfactant and an edible tackifier. The edible film can suitably accept a food flavoring ingredient to form a flavored film that can be used to apply a flavor to a food item.

36 Claims, No Drawings

CARBOXYMETHYL CELLULOSE-BASED FILMS AND EDIBLE FOOD CASINGS MADE THEREFROM

CROSS-REFERENCE TO RELATED APPLICATION

The benefit under 35 U.S.C. §119(e) of U.S. Provisional Patent Application Ser. No. 60/953,650 filed Aug. 2, 2007, is hereby claimed.

BACKGROUND

Field of the Disclosure

The disclosure relates to an edible film composition generally used to apply a flavoring additive to a food item, for example by using the flavored, edible film as a food casing. More particularly, the disclosure relates to an edible film including a carboxymethyl cellulose film-forming resin, a plasticizer, a surfactant, and a tackifier.

Brief Description of Related Technology

Edible films can be used in the food industries to impart a flavoring additive to a food item. The films can be formulated to at least partially disintegrate upon application to a food item to rapidly (e.g., on the order of seconds to minutes) impart the flavoring additive to the food item. Examples of rapidly disintegrating films include films based on hydroxypropyl cellulose, hydroxypropylmethyl cellulose, and polyvinylpyrrolidone.

Flavoring additives that require an extended contact time to impart a desired flavor to a food item can be applied using collagen. A food item is dipped in a collagen bath and a flavoring additive is adhered to the food item using the collagen. However, after the food item has been sufficiently aged (e.g., for about 2-3 weeks), the collagen must be removed from the food item prior to consumption. The collagen removal process is generally a time-consuming, labor-intensive process.

Accordingly, it would be beneficial to obtain a film that can be used to impart a desired flavor to a food item over an extended period, which film also avoids the disadvantage of a time-consuming process to remove the film prior to consumption of the food item.

SUMMARY

The disclosure provides an edible film including an edible carboxymethyl cellulose film-forming resin, an edible plasticizer, an edible surfactant, and an edible tackifier. The edible carboxymethyl cellulose is preferably sodium carboxymethyl cellulose. The edible carboxymethyl cellulose film-forming resin preferably includes a low molecular weight component and a high molecular weight component, with the low molecular weight component having a molecular weight less than that of the high molecular weight component. In an embodiment, the edible carboxymethyl cellulose film-forming resin is a blend of (a) a first carboxymethyl cellulose having a lower, first 2%-aqueous solution viscosity and (b) a second carboxymethyl cellulose having a higher, second 2%-aqueous solution viscosity. Preferably, the first 2%-aqueous solution viscosity is about 10 cP to about 100 cP (or about 25 cP to about 50 cP) at 25° C. and the second 2%-aqueous solution viscosity is about 100 cP to about 1000 cP (or about 200 cP to about 800 cP) at 25° C. The carboxymethyl cellulose preferably has a degree of substitution of about 0.5 to about 1.

Among the additional edible film components, preferred plasticizers include glycerin (in particular), polyethylene glycol, propylene glycol, monoacetin, triacetin, triethyl citrate, sorbitol, 1,3-butanediol, D-glucono-1,5-lactone, and combinations thereof. A preferred edible surfactant is sunflower lecithin, and a preferred edible tackifier is a modified food starch.

Preferably, the edible film has a thickness of about 20 µm to about 100 µm (or about 40 µm to about 75 µm).

Based on the dry weight of the edible film, the edible film preferably includes about 37 wt. % to about 80 wt. % of the edible carboxymethyl cellulose film-forming resin, about 15 wt. % to about 45 wt. % of the edible plasticizer, about 0.2 wt. % to about 3 wt. % of the edible surfactant, and about 2 wt. % to about 15 wt. % of the edible tackifier.

Another aspect of the disclosure provides an edible film including about 35 wt. % to about 70 wt. % (or about 45 wt. % to about 65 wt. %) of a first carboxymethyl cellulose having a lower, first 2%-aqueous solution viscosity, about 2 wt. % to about 10 wt. % (or about 3 wt. % to about 7 wt. %) of a second carboxymethyl cellulose having a higher, second 2%-aqueous solution viscosity, and about 15 wt. % to about 45 wt. % (or about 20 wt. % to about 40 wt. %) of a plasticizer. The weight concentrations are based on the dry weight of the edible film.

Yet another aspect of the disclosure provides a flavored film including any of the disclosed edible films and a food flavoring ingredient. Preferred food flavoring ingredients include spices, herbs, smoke flavor, grill flavor, garlic flavor, pizza flavor, natural fruit flavor, artificial fruit flavor, and combinations thereof. The food flavoring ingredient can be either adhered to an outer surface of the edible film and/or cast as a component of the edible film.

Another aspect of the disclosure provides a method of imparting a flavor to a food item using, the method including: (a) applying any of the disclosed edible films to a food item; (b) adding a food flavoring ingredient to the edible film, thereby forming a flavored film; and, (c) allowing the food item to remain in contact with the flavored film for a predetermined time, thereby imparting the flavor to the food item; wherein steps (a) and (b) can be performed in any order. In one embodiment, the food ingredient is added to the edible film by misting the edible film with an amount of water sufficient to make an outer surface of the edible film tacky, and then adhering the food flavoring ingredient to the tacky outer surface. In another embodiment, the food ingredient is added to the edible film by misting the edible film with an aqueous mixture including water and the food flavoring ingredient. In yet another embodiment, a flavored film having the food flavoring ingredient cast as a component of the edible film is applied directly to the food item, and then the food item is allowed to remain in contact with the flavored film for a predetermined time, thereby imparting the flavor to the food item. Preferred food items include sausage and ham. A preferred method of applying the edible/flavored film includes wrapping the food item. The predetermined time is preferably a time sufficient for the flavored film to be completely disintegrated, dissolved, and/or absorbed into the food item by moisture present in the food item, for example about 1 week to about 4 weeks (or about 2 weeks to about 3 weeks).

Further aspects and advantages will be apparent to those of ordinary skill in the art from a review of the following detailed description. While the disclosed compositions, articles, and methods are susceptible of embodiments in various forms, the description hereafter includes specific embodiments with the understanding that the disclosure is illustrative, and is not intended to limit the invention to the specific embodiments described herein.

DETAILED DESCRIPTION

The edible films described herein generally include an edible carboxymethyl cellulose film-forming resin and an edible plasticizer. The carboxymethyl cellulose film-forming resin is preferably a blend of two different carboxymethyl celluloses having different molecular weights. The edible film preferably includes additional additives, for example an edible surfactant and an edible tackifier.

As used herein, the term "edible" refers to individual components and their resulting compositions that can be safely ingested in the amounts used by humans and/or other animals.

Unless specified otherwise, the composition concentrations disclosed herein are given on a dry weight basis of the total weight of the components (wt. %). The dry weight for the determination of the concentration includes the weight of any resins, plasticizers, surfactants, tackifiers, and optional secondary additives, but excludes the weight of any solvents (e.g., water).

Edible Carboxymethyl Cellulose Film-Forming Resin

Carboxymethyl cellulose ("CMC") is a suitable film-forming resin for the disclosed edible films. CMC is a water-soluble, cellulose-based polymer in which at least some of the hydroxyl groups of the cellulose repeating units are derivatized with carboxymethyl functional groups (i.e., —$CH_2COOX$). The carboxymethyl functional groups can be present in their acid form (i.e., X=H) and/or a salt form (e.g., X=Na, K, etc.). Preferably, the CMC is present as sodium CMC. Preferably, the CMC has a degree of substitution of about 0.5 to about 1, where the degree of substitution represents the average number (up to a maximum of 3) of hydroxyl groups per anhydroglucose monomer that are derivatized with the carboxymethyl functional groups.

CMC is a suitable film-forming resin because the surface of a film formed from the resin becomes tacky upon contact with a small amount of water, yet the film does not rapidly dissolve or disintegrate. The surface tackiness allows food flavoring ingredients to be easily adhered to the film without destroying the mechanical integrity of the film. In contrast, other cellulose-based, edible film-forming resins (e.g., hydroxypropylmethyl cellulose ("HPMC")) are generally unsuitable as a sole film-forming resin component because they dissolve too easily and/or are not sufficiently tacky when contacted by water. However, additional cellulose-based, edible film-forming resins can be used as complements to CMC, for example including methyl cellulose ("MC") used as an additional tackifying film-forming resin.

The CMC film-forming resin preferably includes two components: a low molecular weight component and a high molecular weight component. The low molecular weight component is the more abundant CMC component, and it conveniently increases the appropriate level of solids in an aqueous casting solution of the edible film components. When the solids content of the aqueous casting solution is reduced below an optimum level, drying times increase, casting line speeds decrease, and aesthetic drying defects can form in the resulting film. The high molecular weight component contributes mechanical strength to the edible film, allowing it to be more easily processed and applied to food items of varying geometry without rupturing. The two components can be present, for example, in a CMC film-forming resin having a bimodal molecular weight distribution, where the first mode of the distribution (i.e., the low molecular weight component) has a lower peak molecular weight than the second mode of the distribution (i.e., the high molecular weight component).

The two molecular weight components of the CMC film-forming resin are preferably present as a blend of two CMCs having different solution viscosities (e.g., the viscosity of a 2 wt. % aqueous solution of the CMC, for example at 25° C.). For example, the CMC film-forming resin preferably includes a first CMC (i.e., the low molecular weight component) and a second CMC (i.e., the high molecular weight component), where the solution viscosity of the first CMC is less than that of the second CMC. Preferably, the 2%-aqueous solution viscosity of the first CMC is in a range of about 10 cP to about 100 cP at 25° C. and the 2%-aqueous solution viscosity of the second CMC is in a range of about 100 cP to about 1000 cP at 25° C. More preferably, the 2%-aqueous solution viscosity of the first CMC is in a range of about 25 cP to about 50 cP at 25° C. and the 2%-aqueous solution viscosity of the second CMC is in a range of about 200 cP to about 800 cP at 25° C.

Suitable sodium CMC is commercially available from Hercules, Inc. (Wilmington, Del.) under the AQUALON brand. Particularly preferred grades of the AQUALON sodium CMCs include 7LF (having a degree of substitution of about 0.65 to about 0.9 and a 2%-aqueous solution viscosity of about 25 cP to about 50 cP at 25° C.) and 7M8SF (having a degree of substitution of about 0.65 to about 0.9 and a 2%-aqueous solution viscosity of about 200 cP to about 800 cP at 25° C.).

The concentration of the CMC film-forming resin in the edible film is preferably about 30 wt. % to about 80 wt. %, or about 37 wt. % to about 80 wt. %, for example about 48 wt. % to about 72 wt. %. When the CMC film-forming resin includes the first and second CMC components, the concentration of the first CMC component is about 30 wt. % to about 80 wt. %, or about 35 wt. % to about 70 wt. %, for example about 45 wt. % to about 65 wt. %. Similarly, the concentration of the second CMC component is up to about 30 wt. %, or about 2 wt. % to about 10 wt. %, for example about 3 wt. % to about 7 wt. %.

Plasticizer

The edible film includes at least one edible plasticizer. The plasticizer permeates the polymer structure, disrupts intermolecular hydrogen bonding, and permanently lowers intermolecular attractions. When incorporated into the composition, the plasticizer lowers the glass transition temperature and improves the processability and flexibility of the resulting film. Suitable plasticizers include, but are not limited to: glycerin, polyethylene glycol (e.g., a low-molecular weight liquid, for example having a molecular weight such as MW 200, MW 300, and MW 600), propylene glycol, monoacetin, triacetin, triethyl citrate, sorbitol, 1,3-butanediol, D-glucono-1,5-lactone, and combinations thereof. Glycerin is a preferred plasticizer. The concentration of all plasticizers in the edible film is preferably about 10 wt. % to about 50 wt. %, or about 15 wt. % to about 45 wt. %, for example about 20 wt. % to about 40 wt. %.

Additives

The edible film preferably includes an edible surfactant and an edible tackifier/extender, in addition to other optional secondary additives.

The edible surfactant acts primarily as a wetting agent in an aqueous solution of the edible film components, thereby obtaining a good wetting of a substrate (e.g., stainless steel) in a solution casting process. The surfactant also acts as a release agent. Suitable surfactants include sunflower lecithin, polyoxyethylene sorbitan fatty acid esters (e.g., polysorbate, for example polysorbate 60 or polysorbate 80), polyoxyethylene alkyl ethers, polyoxyethylene castor oil derivatives, and combinations thereof. Sunflower lecithin (e.g., available from Lasenor, S. L., Barcelona, Spain) is a preferred surfactant. The concentration of all surfactants in the edible film is preferably about 0.1 wt. % to about 5 wt. %, or about 0.2 wt. % to about 3 wt. %, for example about 0.5 wt. % to about 2 wt. %.

The edible tackifier increases the surface tackiness of the edible film, improving the ability of the film to adhere to food flavoring ingredients applied to its surface. The tackifier also enhances the appearance of the edible film; in the absence of the tackifier, drying defects arising during casting are evident and there is a general appearance of non-uniformity. Suitable tackifiers include natural and modified starches, for example dextrins, maltodextrins, and pregelatinized wheat starch. A modified food starch (e.g., PURE-COTE B790, available from Grain Processing Corp., Muscatine, Iowa) is a preferred tackifier. The concentration of all tackifiers in the edible film is preferably about 1 wt. % to about 20 wt. %, or about 2 wt. % to about 15 wt. %, for example about 2 wt. % to about 8 wt. %.

The edible film can optionally include secondary additives such as anti-blocking agents (e.g., silica), thickeners (e.g., natural polysaccharide gums), preservatives (e.g., sodium benzoate, potassium sorbate), antifoams (e.g., ANTIFOAM AF, a polysiloxane emulsion available from Orco, Inc., East Providence, R.I.), viscosity reducers (e.g., sodium chloride). Any secondary additives should be ingestible by humans and/or animals in the amounts used. Preferred secondary additives include antifoams and viscosity reducers. When present, the concentration of the antifoam is up to about 1 wt. %, or about 0.01 wt. % to about 0.5 wt. %, for example about 0.1 wt. % to about 0.3 wt. %. Similarly, the concentration of the viscosity reducer is up to about 4 wt. %, or about 0.1 wt. % to about 2 wt. %, for example about 0.2 wt. % to about 1 wt. %.

In addition to the above components of a composition that can be used to form the disclosed edible film (e.g., by solution casting), the resulting edible film can include optional additives coated on its surface. For example, the starches and dextrins described above (e.g., pregelatinized wheat and rice starch) can be coated on the edible film to enhance film tackiness when contacted by water.

Edible Film Formation

The edible film preferably is prepared by solution casting an aqueous mixture of the CMC film-forming resin, the plasticizer, the surfactant, the tackifier, and any secondary additives. The resulting film can have any suitable thickness, and is preferably about 20 μm to about 100 μm, or about 40 μm to about 75 μm, for example about 50 μm.

For example, a suitable casting solution is about 14 wt. % total solids prepared in distilled water. Preferably, all non-CMC ingredients are first mixed in an appropriate amount of distilled water. The CMC ingredients are dry blended (i.e., when more than one CMC component is used) and then added very slowly (i.e., about 10% of the total CMC ingredients every 30 minutes) to the non-CMC aqueous solution while moderately agitating and heating (to 60° C.) the casting solution. When the CMC ingredients are completely dissolved, the agitation is stopped and the casting solution is maintained at 60° C. to allow the solution to degas overnight. The solution is then cast from a doctor blade assembly at a wet thickness of about 350 μm onto a stainless steel surface heated to 90° C. The casting solution is then allowed to dry to form a film having a thickness of about 50 μm. A suitable edible film according to the disclosure and formed by this method is given in Table 1.

TABLE 1

| Edible Film Composition | | |
|---|---|---|
| Component | Function | Wt. % |
| Sodium CMC (AQUALON 7LF) | Film-Forming Resin | 57.73 |
| Sodium CMC (AQUALON 7M8SF) | Film-Forming Resin | 4.89 |
| Glycerin | Plasticizer | 29.35 |
| Sunflower Lecithin | Surfactant | 1.47 |
| Modified Food Starch (PURE-COTE B790) | Tackifier | 5.87 |
| Polysiloxane Emulsion (ANTIFOAM AF) | Antifoam | 0.20 |
| Sodium Chloride | Viscosity Reducer | 0.49 |

Flavored Film and Flavored Food Item

A flavored film can be formed by adding a food flavoring ingredient to the edible film. The flavored film can then be applied to a food item in a variety of ways to impart a flavor to the food item. For example, a food item can be wrapped in a flavored, edible food casing that is formed from the flavored film. The wrapping/casing facilitates the even distribution of the food flavoring ingredient and its subsequent application to the food item. The wrapped food item is then stored for an extended period (i.e., on the order of hours, days, weeks, or longer; for example about 1 to 4 weeks or about 2 to 3 weeks). The extended contact between the flavored film and the food item permits the flavor of the film to be imparted to the food item. Preferably, the flavored film will naturally disintegrate, dissolve, and/or be absorbed by the food item due to the moisture naturally present in the food item. This natural process is desirable because it eliminates the need to perform the time-consuming step of removing a conventional flavored food casing.

The food flavoring ingredients used in the flavored films of the disclosure can include any of various natural and/or artificial flavor components. Examples include spices, herbs, smoke flavor, grill flavor, garlic flavor, pizza flavor, natural or artificial fruit flavors, or other artificial or natural flavors commonly used in food. In addition to flavoring additives, other food enhancing ingredients (e.g., a browning agent) can be added to the flavored films.

The food flavoring ingredient can be added to the edible film in several ways, for example by adhering the food flavoring ingredient to an outer surface of the edible film. When the food flavoring ingredient is available as a particulate solid (e.g., spices, herbs), the edible film is first misted with a small amount of water sufficient make the surface of the edible film tacky without causing any significant dissolution of the edible film. The solid food flavoring ingredient is then adhered to the tacky edible film surface, thereby forming the flavored film. When the food flavoring ingredient is available as an aqueous mixture (e.g., liquid smoke), the food flavoring ingredient can be misted directly onto the edible film, forming the flavored film with a tacky surface as described above. The edible film absorbs the water and any dissolved components of the aqueous mixture. Any dispersed components of the aqueous mixture adhere to the surface of the edible film, due to its tackiness. In either of the above cases, the flavored film can be subsequently applied to a food item. Alternatively, the edible film can be first applied to a food item, and the food flavoring ingredient can be subsequently added to the edible film as described above.

Alternatively, the flavored film can be directly cast by adding the food flavoring ingredient to the aqueous casting solution described above and casting the food flavoring ingredient as a component of the edible film. In this case, the food flavoring ingredient is preferably water-soluble so that it dissolves and is homogeneously dispersed in the casting solution (i.e., and in the resulting film). Regardless of whether the food flavoring ingredient is water-soluble or water-insoluble, it should not be used in amounts that degrade the mechanical properties of the resulting film.

The food items suitable for use with the disclosed flavored films are not particularly limited. Examples of particularly suitable food items include meats and meat products, for example sausages and hams. A distinctive flavor is preferably imparted to such food items by contacting them with herbs and/or spices for an extended ageing period (e.g., about 2 to 3 weeks) sufficient to impart the flavor to the food items. The food items can be wrapped in an edible film flavored with the herbs and/or spices and then allowed to age; the natural moisture present in the food items is sufficient to disintegrate, dissolve, and/or absorb the flavored film by the end of the ageing period.

Edible films based on CMC possess properties that make the films suitable for use in the described flavored films. The films are sufficiently strong and flexible so that they can be easily processed in an automated procedure to apply the film to a food item (e.g., a wrapping process to encase the food item in the flavored film). The films are sufficiently tacky to permit the addition of a variety of food flavoring ingredients to the films. The films also possess the desired intermediate level of water solubility: the films do not immediately disintegrate/dissolve upon contact with water, allowing a wrap to be formed on the food item; yet, the films eventually will disintegrate/dissolve, eliminating an otherwise time-consuming process step.

The foregoing description is given for clearness of understanding only, and no unnecessary limitations should be understood therefrom, as modifications within the scope of the invention may be apparent to those having ordinary skill in the art.

Throughout the specification, where the composition is described as including components or materials, it is contemplated that the compositions can also consist essentially of, or consist of, any combination of the recited components or materials, unless described otherwise.

What is claimed is:

1. An edible film comprising: a water-soluble mixture of an edible carboxymethyl cellulose film-forming resin; an edible plasticizer; an edible surfactant; and, an edible tackifier, wherein the edible carboxymethyl cellulose film-forming resin comprises a low molecular weight component and a high molecular weight component, the low molecular weight component having a molecular weight less than that of the high molecular weight component; and wherein the low molecular weight component is characterized by a 2%-aqueous solution viscosity in a range of about 10 cP to about 100 cP at 25° C. and the high molecular weight component is characterized by a 2%-aqueous solution viscosity in a range of about 100 cP to about 1000 cP at 25° C.

2. The edible film of claim 1, wherein the edible carboxymethyl cellulose film-forming resin comprises sodium carboxymethyl cellulose.

3. The edible film of claim 1, wherein:
the low molecular weight component 2%-aqueous solution viscosity is in a range of about 25 cP to about 50 cP at 25° C.; and,
the high molecular weight component 2%-aqueous solution viscosity is in a range of about 200 cP to about 800 cP at 25° C.

4. The edible film of claim 1, wherein the carboxymethyl cellulose has a degree of substitution of about 0.5 to about 1.

5. The edible film of claim 1, wherein the edible plasticizer is selected from the group consisting of glycerin, polyethylene glycol, propylene glycol, monoacetin, triacetin, triethyl citrate, sorbitol, 1,3-butanediol, D-glucono-1,5-lactone, and combinations thereof.

6. The edible film of claim 5, wherein the edible plasticizer comprises glycerin.

7. The edible film of claim 1, wherein the edible surfactant comprises sunflower lecithin.

8. The edible film of claim 1, wherein the edible tackifier comprises a modified food starch.

9. The edible film of claim 1, wherein the edible film has a thickness of about 20 µm to about 100 µm.

10. The edible film of claim 1, wherein the edible film comprises:
about 37 wt. % to about 80 wt. % of the edible carboxymethyl cellulose film-forming resin, based on the dry weight of the edible film;
about 15 wt. % to about 45 wt. % of the edible plasticizer, based on the dry weight of the edible film;
about 0.2 wt. % to about 3 wt. % of the edible surfactant, based on the dry weight of the edible film; and,
about 2 wt. % to about 15 wt. % of the edible tackifier, based on the dry weight of the edible film.

11. An edible film comprising:
about 35 wt. % to about 70 wt. %, based on the dry weight of the edible film, of a first carboxymethyl cellulose having a first 2%-aqueous solution viscosity;
about 2 wt. % to about 10 wt. %, based on the dry weight of the edible film, of a second carboxymethyl cellulose having a second 2%-aqueous solution viscosity; and,
about 15 wt. % to about 45 wt. %, based on the dry weight of the edible film, of a plasticizer;
wherein the first 2%-aqueous solution viscosity is less than the second 2%-aqueous solution viscosity.

12. The edible film of claim 11, wherein the first carboxymethyl cellulose and the second carboxymethyl cellulose each comprise sodium carboxymethyl cellulose.

13. The edible film of claim 11, wherein:
the first 2%-aqueous solution viscosity is in a range of about 25 cP to about 50 cP at 25° C.; and,
the second 2%-aqueous solution viscosity is in a range of about 200 cP to about 800 cP at 25° C.

14. The edible film of claim 11, wherein the edible plasticizer is selected from the group consisting of glycerin, polyethylene glycol, propylene glycol, monoacetin, triacetin, triethyl citrate, sorbitol, 1,3-butanediol, D-glucono-1,5-lactone, and combinations thereof.

15. The edible film of claim 14, wherein the edible plasticizer comprises glycerin.

16. The edible film of claim 11, wherein the edible film has a thickness of about 40 µm to about 75 µm.

17. The edible film of claim 11, wherein the edible film comprises:
about 45 wt. % to about 65 wt. %, based on the dry weight of the edible film, of the first carboxymethyl cellulose;
about 3 wt. % to about 7 wt. %, based on the dry weight of the edible film, of the second carboxymethyl cellulose; and,
about 20 wt. % to about 40 wt. %, based on the dry weight of the edible film, of the plasticizer.

18. A flavored film comprising:
the edible film of claim 1; and,
a food flavoring ingredient.

19. The flavored film of claim 18, wherein the food flavoring ingredient is selected from the group consisting of spices, herbs, smoke flavor, grill flavor, garlic flavor, pizza flavor, natural fruit flavor, artificial fruit flavor, and combinations thereof.

20. The flavored film of claim 18, wherein the food flavoring ingredient is adhered to an outer surface of the edible film.

21. The flavored film of claim 18, wherein the food flavoring ingredient is cast as a component of the edible film.

22. A method of imparting a flavor to a food item, the method comprising:
(a) applying the edible film according to claim 1 to a food item;
(b) adding a food flavoring ingredient to the edible film, thereby forming a flavored film; and,
(c) allowing the food item to remain in contact with the flavored film for a predetermined time, thereby imparting the flavor to the food item;
wherein steps (a) and (b) can be performed in any order.

23. The method of claim 22, wherein the food item is selected from the group consisting of sausage and ham.

24. The method of claim 22, wherein step (a) comprises wrapping the food item with the edible film.

25. The method of claim 22, wherein step (b) comprises misting the edible film with an amount of water sufficient to make an outer surface of the edible film tacky, and then adhering the food flavoring ingredient to the tacky outer surface.

26. The method of claim 22, wherein step (b) comprises misting the edible film with an aqueous mixture comprising water and the food flavoring ingredient.

27. The method of claim 22, wherein the predetermined time is a time sufficient for the flavored film to be completely disintegrated, dissolved, and/or absorbed into the food item by moisture present in the food item.

28. The method of claim 22, wherein the predetermined time is about 1 week to about 4 weeks.

29. A method of imparting a flavor to a food item, the method comprising:
(a) applying the flavored film of claim 21 to a food item; and,
(b) allowing the food item to remain in contact with the flavored film for a predetermined time, thereby imparting the flavor to the food item.

30. The method of claim 29, wherein the food item is selected from the group consisting of sausage and ham.

31. The method of claim 29, wherein step (a) comprises wrapping the food item with the flavored film.

32. The method of claim 29, wherein the predetermined time is a time sufficient for the flavored film to be completely disintegrated, dissolved, and/or absorbed into the food item by moisture present in the food item.

33. The method of claim 29, wherein the predetermined time is about 1 week to about 4 weeks.

34. The edible film of claim 1, wherein the film dissolves or disintegrates upon contact with a food item only after a period of at least one week.

35. An edible film comprising: a water-soluble mixture of
a mixture of water-soluble, film-forming resins consisting of a low molecular weight CMC characterized by a 2%-aqueous solution viscosity in a range of about 10 cP to about 100 cP at 25° C. and a high molecular weight CMC characterized by a 2%-aqueous solution viscosity in a range of about 100 cP to about 1000 cP at 25° C.;
an edible plasticizer;
an edible surfactant; and,
an edible tackifier.

36. The edible film of claim 35, wherein
the mixture of water-soluble, film-forming resins consisting of a low molecular weight CMC and high molecular weight CMC is present in amount of about 37 wt. % to about 80 wt. %, based on the dry weight of the edible film;
the edible plasticizer is present in an amount of about 15 wt. % to about 45 wt. %, based on the dry weight of the edible film;
the edible surfactant is present in an amount of about 0.2 wt. % to about 3 wt. %, based on the dry weight of the edible film; and,
the edible tackifier is present in an amount of about 2 wt. % to about 15 wt. %, based on the dry weight of the edible film.

* * * * *